C. W. NORTON.
GALVANIC BATTERY.
APPLICATION FILED SEPT. 25, 1916.
1,297,487.
Patented Mar. 18, 1919.
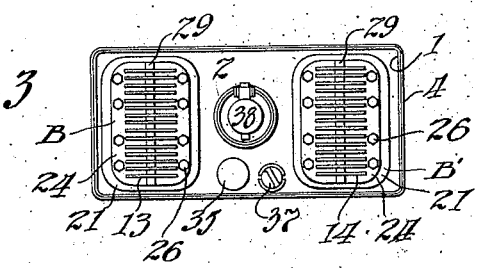
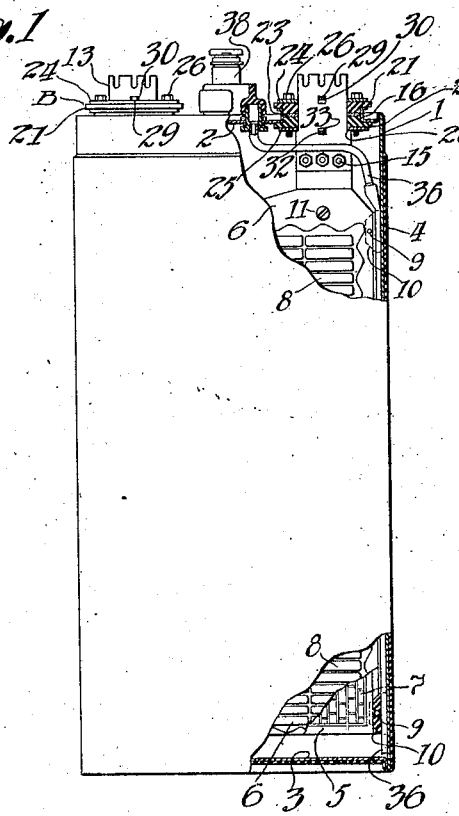
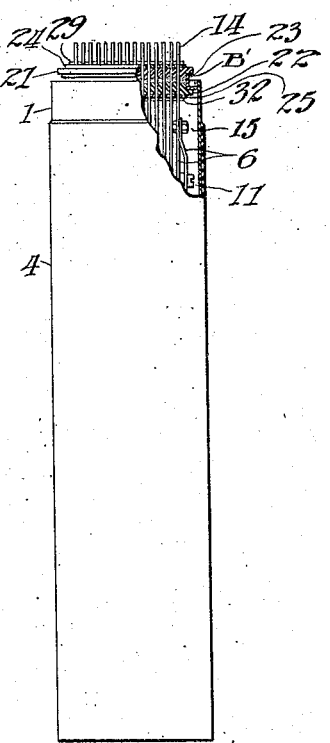
Witnesses:
H. L. Fisher.
William A. Hardy.
Inventor:
Charles W. Norton
by Dyer and Holden
his Attys.

UNITED STATES PATENT OFFICE.

CHARLES W. NORTON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

GALVANIC BATTERY.

1,297,487.

Specification of Letters Patent. Patented Mar. 18, 1919.

Application filed September 25, 1916. Serial No. 121,939.

*To all whom it may concern:*

Be it known that I, CHARLES W. NORTON, a citizen of the United States, and a resident of West Orange, in the county of Essex and State of New Jersey, have invented certain new and useful Improvements in Galvanic Batteries, of which the following is a description.

My invention relates to galvanic batteries and more particularly to improvements in storage batteries and in the mechanical details of construction thereof. While the present invention is adapted especially for use in storage battery cells of the Edison type designed for submarine service, wherein the electrolyte and battery elements are disposed in large strong metallic cans or containers, it is to be understood that my invention may also be effectively employed in battery cells of other types.

The principal object of my invention is to provide a battery cell with improved means for supporting the battery elements within the cell container, such means preferably being so arranged as to obviate the necessity of employing a bottom insulator or support within the cell container for the battery elements.

Another object of my invention is to provide in a battery cell having a closed container, an improved construction, preferably including the means for supporting the battery elements, for preventing or eliminating buckling or bending of any parts of the stuffing boxes through which the poles of the cell preferably extend. My invention also contemplates an improved construction and arrangement, whereby the various elements of the cell may be readily assembled.

Other features of my invention reside in the construction of parts and combinations of elements hereinafter more particularly described and claimed.

In order that my invention may be more clearly understood, attention is directed to the accompanying drawing forming a part of this specification, in the several figures of which like parts are designated by the same reference characters, and in which:

Figure 1 is a view in side elevation, partly broken away and partly in section, showing an Edison storage battery cell of the submarine type constructed in accordance with my invention;

Fig. 2 is a view in end elevation, partly broken away and partly in section, of the cell shown in Fig. 1; and Fig. 3 is a plan view thereof.

Referring to the drawing, reference character 1 represents the can or container of a secondary cell or battery, which container is substantially rectangular in form and preferably has the top 2 and bottom 3 welded to the side walls thereof, as is usual in storage batteries of the Edison type. The bottom and side walls of the container 1 are preferably provided with a coating or covering 4 of rubber or other suitable insulating material, this covering preferably terminating a slight distance below the top of the container.

Within the container 1 is disposed a group of positive and negative plates or elements 5 and 6. These positive and negative plates are preferably alternately arranged side by side and extend transversely of the container. The number of negative plates preferably exceeds the number of positive plates by one, whereby the plates adjacent the front and rear walls of the container will be of negative polarity. Each plate preferably comprises a substantially rectangular grid to which are suitably secured positive or negative tubes or pockets, the positive tubes 7 preferably being vertically disposed and the negative pockets 8 preferably being horizontally disposed. The positive and negative plates on the opposite sides of the cell are respectively rigidly secured together and the plates are spaced and insulated from each other and from the adjacent side walls of the container 1, preferably by means of bolts 9 and insulating blocks 10 of hard rubber mounted on the bolts. All the plates are rigidly secured together and spaced and insulated from each other at their upper portions, preferably by means of bolts 11 and hard rubber washers or sleeves mounted on these bolts. The plates are insulated and spaced from the front and rear walls of the container 1 by any suitable means (not shown). The positive plates 5 are each provided adjacent one side with an integral vertical projection or portion 13, and the negative plates 6 are each provided adjacent the opposite side with an integral vertical projection or portion 14. The projections 13 are each in the same plane as the plate 5 of which it is a part; and all these projections extend through a stuffing box B secured in the top 2 of the container. All the projections 14, except those of the two outside negative plates 6, are each in the same plane as the respective plate 6 of which it forms a part, and extends through a stuffing box B' secured in the top 2 of the container. The projections 13 and 14 which extend through the stuffing boxes B and B' form the poles or terminals of the cell, and the outer end portions thereof serve as convenient means for making electrical connections with the cell.

The length of the cell depends on the number of plates therein and the length of the stuffing boxes B and B' required for the respective series of projections 13 and 14. If all of the projections 14 of the negative plates were extended through the stuffing box B', the latter would have to be somewhat longer than the stuffing box B, as the number of negative plates is greater by one than the number of positive plates. Accordingly, the projections 14 of the two outside negative plates are each terminated inside the container 1 and electrically connected above the level of the electrolyte to the adjacent negative plate, and only the projections of the remainder of the negative plates are extended through the stuffing box B'. Therefore, the latter may be made as short as stuffing box B, whereby a considerable reduction in the length of the container 1 and in consequence a saving in the amount of electrolyte and weight of the cell may be effected. The electrical connection of each outside plate 6 with the adjacent negative plate is preferably effected by inwardly deflecting the upper end portion of the projection 14 of the outside plate and connecting the same directly to the adjacent projection 14, as by means of bolts 15.

Each of the stuffing boxes B and B' is secured to the container top 2 in a substantially rectangular opening extending lengthwise of the container, the material of the top 2 at the edge of each of these openings being formed into an upstanding flange 16. Each of the stuffing boxes preferably comprises a pair of flanged hard rubber members or bushings 21 and 22 and a suitable resilient packing member 23, preferably of soft rubber, interposed between members 21 and 22. A pair of metallic plates 24 and 25 are respectively disposed above the upper member or bushing 21 and beneath the lower member 22 of each stuffing box, and bolts 26 are passed through members 21, 22, 23, 24 and 25, the heads of the bolts 26 bearing on the upper plate 24 and the lower ends thereof being threaded into the lower plate 25. Members 21, 22, 23, 24 and 25 are provided with registering openings or slots through which the projections 13 or 14 extend. The surface of members 21 and 22 which engage the packing member 23 are preferably corrugated or provided with ridged portions parallel to and adjacent the openings or slots therein. It will be obvious that on tightening the bolts 26, members 21 and 22 will be forced toward each other and the soft rubber members 23 will thereby be compressed and extended laterally to form fluid-tight joints with the projections 13 and 14. By reason of the raised or ridged portions on members 21 and 22, but a comparatively slight movement of these members toward each other is necessary in order to extend member 23 laterally sufficiently to render the joints fluid-tight.

The flat projections 13 and 14 which extend through the stuffing boxes are each provided at the side edges thereof with shoulders 28 which engage the plates 25 and serve to prevent outward movement of the battery elements or plates 5 and 6 with respect to the container 1 when the cell is lifted by its terminals.

The construction above described is similar to that shown and described in my copending application Serial No. 856,527, filed August 13, 1914, and entitled Secondary or storage batteries, and to which reference is made for a more detailed description.

In order to obviate the necessity of employing a bottom insulator or support for the elements or plates 5 and 6, I provide means for supporting or suspending these elements from the top 2 of the container 1. This means preferably consists of keys or rods 29 driven through alined holes or openings 30 provided therefor in the extensions 13 and 14 of the elements or plates 5 and 6, after the stuffing boxes B and B' have been drawn up tightly by means of bolts 26. The keys 29 then rest upon the top plates 24 of the stuffing boxes and the plates or elements 5 and 6 are suspended or supported therefrom and thereby from the top 2 of the container. Before the assembling of the stuffing boxes B and B', keys 32 similar to keys 29 are preferably driven through alined holes 33 provided therefor in the projections 13 and 14 below the holes 30. When the stuffing boxes are assembled and the stuffing boxes B and B' are drawn up tightly by means of bolts 26, the bottom keys 32 and the shoulders 28 prevent buckling of the lower plates 25 of the stuffing boxes between the rows of bolts 26. Keys 29 and 32 are preferably rectangular in cross section and the holes or openings 30 and 33 therefor in the projections 13 and 14 are likewise rectangular. The lower holes or openings 33 extend a distance below the shoulders 28 equal to the thickness of the keys 32 so that the tops of the latter will be in the same plane with said shoulders when disposed within these openings. Openings 33, however, extend slightly above the level of shoulders 28 to provide clearance for keys 32. The tops of openings 30, after elements 5 and 6 have been assembled, are at the same level, which level is such that when the keys 29 are driven through these openings the portions of the top plates 24 of the stuffing boxes between the rows of bolts will be forced down to the same level as the portions thereof directly under the heads of the bolts 26, and consequently any buckling of these plates 24 will be eliminated. The openings 30 are preferably somewhat deeper than the thickness of keys 29 to provide clearance for the latter.

It will be apparent that this arrangement constitutes simple means for facilitating the assembling of the stuffing boxes B and B' and for preventing and eliminating buckling of the bottom and top plates 25 and 24 of the stuffing boxes when the latter are drawn up tightly by means of bolts 26. The upper keys 29 also serve to support or suspend the plates or elements 5 and 6 entirely from the top 2 of the container.

The cell is preferably provided with the usual filling opening in the top 2 thereof which is normally maintained closed by the cap or cover 35.

Reference character 38 indicates generally a safety device secured in the top 2 of the container for controlling the escape of gases from and the admission of air to the interior of the cell, and is preferably similar to the construction disclosed and claimed in an application of Robert A. Bachman and myself, Serial No. 163,571, filed April 21, 1917, and entitled Safety devices.

The cell is also preferably provided with a tubular member or drain tube 36 extending through and secured to the container top 2, and having its upper end normally closed by a cap 37 and its lower end terminating adjacent the bottom of the container. On removing cap 37, the electrolyte of the cell may be readily removed, without tipping or injuring the cell, either by applying pressure to the surface of the electrolyte through the safety device 38 or suction to the upper end of the tubular member. The device for removing the electrolyte is similar to that disclosed and claimed in an application of Miller Reese Hutchison, Serial No. 834,293, filed April 25, 1914 and entitled Storage batteries.

It is to be understood that many changes in the form, size and arrangement of parts of the construction shown and described herein may be made without any departure from the spirit of my invention and the scope of the appended claims.

Having now described my invention, what I claim as new and desire to protect by Letters Patent is as follows:

1. In a battery cell, a container having a top, a stuffing box applied to said top supported thereby, a battery element extending through the stuffing box and supporting means coacting with the stuffing box and applied to said element whereby the element is suspended and supported in position within the container entirely from the top thereof, substantially as described.

2. In a battery cell, a container having a top, a plurality of battery elements disposed therein, each having a portion projecting through the top of the container and a single supporting means applied to all of said portions above the top and engaging the top of the container whereby the battery elements are suspended and supported in position within the container from the top thereof only, substantially as described.

3. In a battery cell, a container, a battery element within the container, a stuffing box applied to the top of the container, said element having a portion extending through said stuffing box, and means extending through said portion and coacting with said stuffing box whereby said element is supported from the latter within said container, substantially as described.

4. In a battery cell, a container having a top supported thereby, a stuffing box applied to said top and comprising a plurality of members movable toward each other to form a tight joint, a battery element having a pole extending through said stuffing box and supporting means engaging the outer member of said stuffing box and applied to said pole for supporting and suspending said element entirely from said top, substantially as described.

5. In a battery cell, a stuffing box, a pole extending through said stuffing box, said stuffing box comprising a plurality of members movable toward each other to form a tight joint with said pole, and means applied to said pole for preventing one of said members from bending or buckling upon the movement of the members toward each other, substantially as described.

6. In a battery cell, a stuffing box, a pole extending therethrough, said stuffing box comprising a resilient element, a plate and a pair of spaced members for forcing said element and plate toward each other to cause said resilient element to form a tight joint with said pole, and means applied to said pole for preventing the bending or buckling of said plate intermediate said members when said element and plate are moved toward each other by said members, substantially as described.

7. In a battery cell, a container having a stuffing box, a battery element extending through said stuffing box, said stuffing box comprising a pair of members movable toward each other to form a tight joint with said element, devices disposed at opposite sides of said element for forcing said members together, and a device applied to said element just above the stuffing box for eliminating any buckling which may have occurred in the upper one of said members upon forcing the latter toward each other, substantially as described.

8. In a battery cell, a container having a stuffing box, a battery element extending through said stuffing box, said stuffing box comprising a pair of members movable toward each other to form a tight joint with said element, and devices disposed at opposite sides of said element for forcing said members toward each other, and a device applied to said element just above the stuffing box for supporting said element entirely from the top of the container and for eliminating any buckling which may have occurred in the upper one of said members upon forcing such members toward each other, substantially as described.

9. In a battery cell, a container having a stuffing box, a battery element extending through said stuffing box, said stuffing box comprising a pair of members movable toward each other to form a tight joint with said element, and devices disposed at opposite sides of said element for forcing said members toward each other, and means applied to said element just below the stuffing box for preventing buckling or bending of the lower one of said members when such members are forced toward each other, substantially as described.

10. In a battery cell, a container having a stuffing box, a battery element having a portion extending through said stuffing box, said stuffing box comprising a pair of superposed members movable toward each other to form a tight joint with said portion, and devices disposed at opposite sides of said element for forcing said members toward each other, and means for preventing and eliminating buckling or bending of either of said members caused by forcing the same toward each other, said means comprising a device for supporting the battery element from the stuffing box, substantially as described.

11. In a battery cell, a stuffing box comprising a plurality of members movable toward each other to form a tight joint, and plates between which the members are interposed, bolts clamping said members and plates together, poles extending through said stuffing box, and keys extending through said poles between said bolts and engaging said plates to support the poles from the top and to prevent the buckling of the parts of said stuffing box between the bolts, substantially as described.

12. In a battery cell, a stuffing box comprising a plurality of members movable toward each other to form a tight joint, bolts clamping said members together, one or more poles extending through said stuffing box, and means extending through said poles between said bolts and engaging certain of said members to support the poles from the top and to prevent the buckling of the parts of said stuffing box, substantially as described.

This specification signed and witnessed this 19th day of September, 1916.

CHARLES W. NORTON.

Witnesses:
WILLIAM A. HARDY,
FREDERICK BACHMANN.